(12) United States Patent
Sano (10) Patent No.: US 7,937,116 B2
(45) Date of Patent: May 3, 2011

(54) ELECTRONIC DEVICE, INCOMING CALL NOTIFICATION CONTROL METHOD, AND INCOMING CALL NOTIFICATION CONTROL PROGRAM

(75) Inventor: Shoichi Sano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 853 days.

(21) Appl. No.: 11/772,415

(22) Filed: Jul. 2, 2007

(65) Prior Publication Data

US 2008/0125184 A1 May 29, 2008

Related U.S. Application Data (63) Continuation of application No. PCT/JP2005/001120, filed on Jan. 27, 2005.

(51) Int. Cl.
*H04B 1/38* (2006.01)
(52) U.S. Cl. ..................... 455/567; 455/414.1
(58) Field of Classification Search .................. 455/403, 455/412.2, 414.1, 418, 553.1, 556.1, 90.1, 455/567
See application file for complete search history.

(56) References Cited

U.S. PATENT DOCUMENTS

| | | | |
|---|---|---|---|
| 7,024,229 B2* | 4/2006 | Nishimura | 455/567 |
| 2002/0028662 A1 | 3/2002 | Yoshinaga | 455/90 |
| 2002/0147033 A1* | 10/2002 | Ban et al. | 455/566 |
| 2003/0013484 A1* | 1/2003 | Nishimura et al. | 455/556 |
| 2005/0105714 A1* | 5/2005 | Ono et al. | 379/373.01 |
| 2005/0282576 A1* | 12/2005 | Delker et al. | 455/550.1 |
| 2007/0037610 A1* | 2/2007 | Logan | 455/574 |

FOREIGN PATENT DOCUMENTS

| | | |
|---|---|---|
| JP | 09-321845 | 12/1997 |
| JP | 10-200933 | 7/1998 |
| JP | 2002-314641 | 10/2002 |
| JP | 2005-110067 | 4/2005 |

OTHER PUBLICATIONS

International Search Report and Written Opinion issued in corresponding International Application No. PCT/JP2005/001120 (11 pp.).
Japanese Patent Office Notice of Reasons for Rejection mailed Mar. 16, 2010 for corresponding Japanese Patent Application No. 2007-500381.
SenSay: "The 'Phone With a Mind' Changes Way Users and Cell Phones Interact," Carnegie Mellon Engineering, iNews, Sep./Oct. 2003.
Daniel Siewiorek, et al., "SenSay: A Context-Aware Mobile Phone", Proceedings of the Seventh IEEE International Symposium on Wearable Computers (ISWC'03), 2003.
Daniel Siewiorek, et al., "SenSay: A Context-Aware Mobile Phone" Human Computer Interaction Institute and Institute for Complex Engineered Systems, Carnegie Mellon University, 2003.

* cited by examiner

*Primary Examiner* — Jean A Gelin
(74) *Attorney, Agent, or Firm* — Staas & Halsey LLP (57) ABSTRACT

Disclosed is an electronic device having a communication function, the device comprising: a condition detection section 11 that detects user's operating conditions in the electronic device; a controller 1 that switches an incoming call notification mode based on at least one of the operating conditions; and a notification section that performs an incoming call notification to a user according to the incoming call notification mode.

12 Claims, 5 Drawing Sheets

S = (NUMERIC KEYPAD HAS BEEN OPERATED WITH PREVIOUS PREDETERMINED TIME PERIOD Ta)
OR (TOUCH PANEL HAS BEEN OPERATED WITH PREVIOUS PREDETERMINED TIME PERIOD Ta)
OR (CPU LOAD IS NOT LESS THAN PREDETERMINED CPU LOAD La)
AND (BRIGHTNESS OBTAINED BY OPTICAL SENSOR IS NOT LESS THAN PREDETERMINED BRIGHTNESS Ba)
AND (PRESSURE OBTAINED BY PRESSURE SENSOR IS NOT LESS THAN PREDETERMINED PRESSURE Pa)
OR (OPERATION FLAG HAS BEEN SET IN APPLICATION EXECUTION SECTION)
OR (NOT (CURRENT TIME FALLS WITHIN PREDETERMINED TIME PERIOD FROM PREDETERMINED TIME T0 TO PREDETERMINED TIME T1)

ELECTRONIC DEVICE, INCOMING CALL NOTIFICATION CONTROL METHOD, AND INCOMING CALL NOTIFICATION CONTROL PROGRAM

This application is a continuation of International Application No. PCT/JP2005/001120, filed on Jan. 27, 2005, the disclosure of which is herein incorporated by reference.

TECHNICAL FIELD

The present invention relates to an electronic device having a communication function, an incoming call notification control method, and an incoming call notification control program.

BACKGROUND ART

Some handheld terminals such as a PDA (Personal Digital Assistant) have a communication function. When an incoming call is received while a user is operating such a PDF, he or she is surprised at an incoming sound, or cannot perform a prompt off-hook operation due to preoccupation with other operation.

As a prior art relating to the present invention, there is known, e.g., the following Patent Document 1. As a counter-measure against the above disadvantage, a portable radio apparatus disclosed in this Document is configured to select an incoming call notification means according to vibration information and temperature information.

Patent Document 1: Jpn. Pat. Appln. Laid-Open Publication No. 10-200933 (Pages 1 to 2, FIG. 1)

DISCLOSURE OF INVENTION

A handheld terminal like the one disclosed in Patent Document 1 detects an environmental condition thereof using various sensors. However, there may a case where the condition is erroneously judged to select an inadequate incoming call notification mode.

For example, assume that the handheld terminal is placed on a warm and soft object. In this case, the handheld terminal may determine, according to a temperature sensor and contact sensor, that it is being held by a user's hand. Accordingly, the handheld terminal selects a lighting mode as an incoming call notification to blink a lamp although a user does not watch it.

Further, assume that a user is operating a handheld terminal placed on a desk in a dark, low temperature environment. In this case, the handheld terminal may determine, according to a brightness sensor, temperature sensor, and contact sensor, that it is being away from a user. Accordingly, the handheld terminal selects a ring alert mode as an incoming call notification to frighten the user by an incoming ringer.

The present invention has been made to solve the above problem, and an object thereof is to provide an electronic device, an incoming call notification control method, and an incoming call notification control program capable of performing adequate operation in accordance with a condition at incoming time.

To solve the above problem, according to a first aspect of the present invention, there is provided an electronic device having a communication function, comprising: a condition detection section that detects user's operating conditions in the electronic device; a controller that switches an incoming call notification mode based on at least one of the operating conditions; and a notification section that performs an incoming call notification to a user according to the incoming call notification mode.

In the electronic device according to the present invention, the condition detection section detects, as the operation condition, any of a key operation, a touch panel operation, a CPU load, and an identifier set in an application program while it is running.

In the electronic device according to the present invention, the condition detection section further detects, as the operation condition, any of an ambient brightness surrounding the electronic device and a pressure applied thereto.

In the electronic device according to the present invention, the incoming call notification mode includes one using sound and one by display.

In the electronic device according to the present invention, in the incoming call notification mode by display, the notification section displays reply method entries to allow a user to select a desired one.

In the electronic device according to the present invention, the incoming call notification mode is determined based on logical expressions using a plurality of the operating conditions, and the logical expressions are set by a user.

According to a second aspect of the present invention, there is provided an incoming call notification control method for controlling an electronic device having a communication function, comprising: a condition detection step that detects user's operating conditions in the electronic device; a control step that switches an incoming call notification mode based on at least one of the operating conditions; and a notification step that performs an incoming call notification to a user according to the incoming call notification mode.

In the incoming call notification control method according to the present invention, the condition detection step detects, as the operation condition, any of a key operation, a touch panel operation, a CPU load, and an identifier set in an application program while it is running.

In the incoming call notification control method according to the present invention, the condition detection step further detects, as the operation condition, any of an ambient brightness surrounding the electronic device and a pressure applied thereto.

In the incoming call notification control method according to the present invention, the incoming call notification mode includes one using sound and one by display.

In the incoming call notification control method according to the present invention, in the incoming call notification mode by display, the notification step displays reply method entries to allow a user to select a desired one.

In the incoming call notification control method according to the present invention, the incoming call notification mode is determined based on logical expressions using a plurality of the operating conditions, and the logical expressions are set by a user.

According to a third aspect of the present invention, there is provided an incoming call notification control program allowing an electronic device having a communication function to execute an incoming call notification control method for controlling the electronic device, the program allowing the electronic device to execute: a condition detection step that detects user's operating conditions in the electronic device; a control step that switches an incoming call notification mode based on at least one of the operating conditions; and a notification step that performs an incoming call notification to a user according to the incoming call notification mode.

BEST MODE FOR CARRYING OUT THE INVENTION

An embodiment of the present invention will be described below with reference to the accompanying drawings.

First, a configuration of a handheld terminal which is an electronic device according to the present invention will be described.

Figure 1:
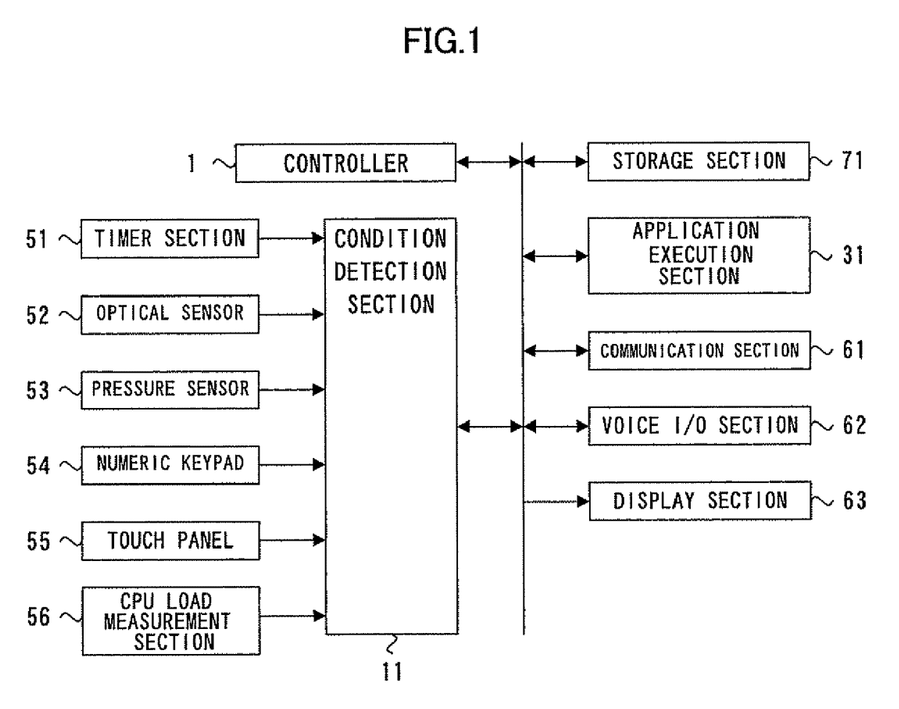
FIG. 1 is a block diagram showing an example of a configuration of an electronic device according to the present invention.

FIG. 1 is a block diagram showing an example of a configuration of the handheld terminal according to the present invention. The handheld terminal shown in FIG. 1 includes a controller 1, a condition detection section 11, an application execution section 31, a timer section 51, an optical sensor 52, a pressure sensor 53, a numeric keypad 54, a touch panel 55, a CPU (Central processing Unit) load measurement section 56, a communication section 61, a voice I/O section 62, a display section 63, and a storage section 71.

The timer section 51 measures a time. The optical sensor 52 measures an ambient brightness surrounding the handheld terminal. The pressure sensor 53 measures a pressure applied by a user holding the handheld terminal. The numeric keypad 54 and touch panel 55 receives a user's input operation. The CPU load measurement section 56 monitors CPU idle time in the handheld terminal and determines that the handheld terminal is not used by a user in the case where an idle state continues. The communication section 61 performs communication with an external device through a wireless communication line. The voice I/O section 62 inputs voice or the like to be transmitted and outputs received voice, ring alert or the like. The display section 63 displays information to a user. The condition detection section 11 uses the timer section 51, optical sensor 52, pressure sensor 53, numeric keypad 54, touch panel 55, and CPU load measurement section 56 to detect a condition of the handheld terminal. The storage section 71 stores an application program, data, phonebook, voice, setting, and the like.

The setting to be stored in the storage section 71 include predetermined time period Ta and Tb, predetermined CPU load La, predetermined brightness Ba, predetermined pressure Pa, predetermined time T0 and T1, incoming call notification mode, and the like. The above values are previously stored in the storage section 71. The incoming call notification mode includes a sound mode and display mode.

Operation of the handheld terminal according to the present invention at incoming time will next be described.

Figure 2:
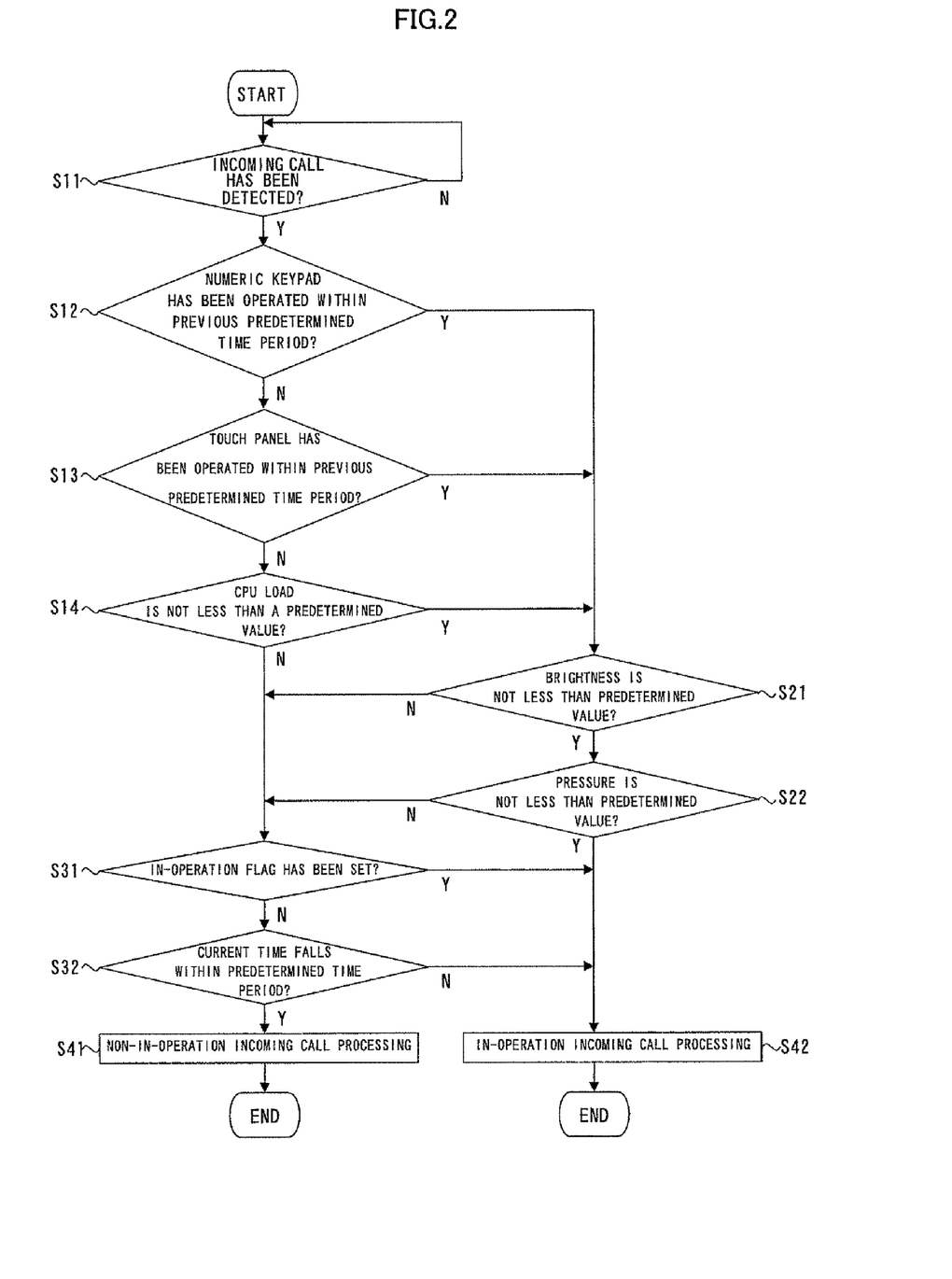
FIG. 2 is a flowchart showing an example of operation of the electronic device according to the present invention at incoming time.

FIG. 2 is a flowchart showing an example of operation of the handheld terminal according to the present invention at incoming time. The controller 1 determines, in its standby mode, whether the communication section 61 has detected an incoming call (S11).

When the communication section 61 has not detected an incoming call (N in S11), the flow returns to step S11 and standby mode is continued. When the communication section 61 has detected an incoming call (Y in S11), the condition detection section 11 determines whether the numeric keypad 54 has been operated by a user within a previous predetermined time period Ta (S12). That is, in the case where the numeric keypad 54 has been operated by a user within a previous predetermined time period Ta, the condition detection section 11 determines that it is likely that a user is operating the handheld terminal.

When the numeric keypad has been operated within a predetermined time period (Y in S12), the flow shifts to step S21. When the numeric keypad has not been operated within a predetermined time period (N in S12), the condition detection section 11 determines whether the touch panel 55 has been operated within a previous predetermined time period Tb (S13). That is, in the case where the touch panel 55 has been operated by a user within a previous predetermined time period Tb, the condition detection section 11 determines that it is likely that a user is operating the handheld terminal.

When the touch panel has been operated within a predetermined time period (Y in S13), the flow shifts to step S21. When the touch panel has not been operated within a predetermined time period (N in S13), the condition detection section 11 determines whether a CPU load obtained by the CPU load measurement section is not less than a predetermined CPU load La (S14). That is, in the case where the CPU load is not less than a predetermined CPU load La, the condition detection section 11 determines that it is likely that a user is operating the handheld terminal.

When the CPU load is less than a CPU load La (N in S14), the flow shifts to step S31. When the CPU load is not less than a CPU load La (Y in S14), the condition detection section 11 determines whether a brightness obtained by the optical sensor 52 is not less than a predetermined brightness Ba (S21). That is, in the case where the brightness is not less than a predetermined brightness Ba, the condition detection section 11 determines that it is likely that a user is operating the handheld terminal.

When the brightness is less than a brightness Ba (N in S21), the flow shifts to step S31. When the brightness is not less than a brightness Ba (Y in S21), the condition detection section 11 determines whether a pressure obtained by the pressure sensor 53 is not less than a predetermined pressure Pa (S22). That is, in the case where the pressure is not less than a predetermined pressure Pa, the condition detection section 11 determines that it is likely that a user is operating the handheld terminal.

When the pressure is not less than a pressure Pa (Y in S22), the flow shifts to step S42. When the pressure is less than a pressure Pa (N in S22), the condition detection section 11 determines whether an in-operation flag has been set in the application execution section 31 (S31). That is, in the case where the in-operation flag has been set, the condition detection section 11 determines that a user is operating the handheld terminal. Here, there is a case where an incoming call notification using sound should not be made depending on the application type. For example, this is a case where a user is thinking for a long time during character input operation or handheld terminal is reproducing/recording music, etc. Thus, in the case where an incoming call using sound should not be made, the application execution section 31 sets the in-operation flag and, thereby, the condition detection section 11 determines that the handheld terminal is in operation.

When the in-operation flag has been set (Y in S31), the flow shifts to step S42. When the in-operation flag has not been set (N in S31), the condition detection section 11 determines whether the current time obtained by the timer section 51 falls within a predetermined time period between a predetermined time T0 to a predetermined time T1 (S32). The time period between a predetermined time T0 to a predetermined time T1 is a time period that has previously been set as one during which a user will not use the handheld terminal.

When the current time falls within a predetermined time period (Y in S32), the condition detection section 11 determines that the handheld terminal is not in operation. Based on the determination, the controller 1 starts non-in-operation incoming call processing (S41), and this flow is ended. When the current time does not fall within a predetermined time period (N in S32), the condition detection section 11 determines that the handheld terminal is in operation. Based on the determination, the controller 1 starts in-operation incoming call processing (S42), and this flow is ended.

Operation of the non-in-operation incoming call processing performed in the handheld terminal according to the present invention will next be described.

Figure 3:
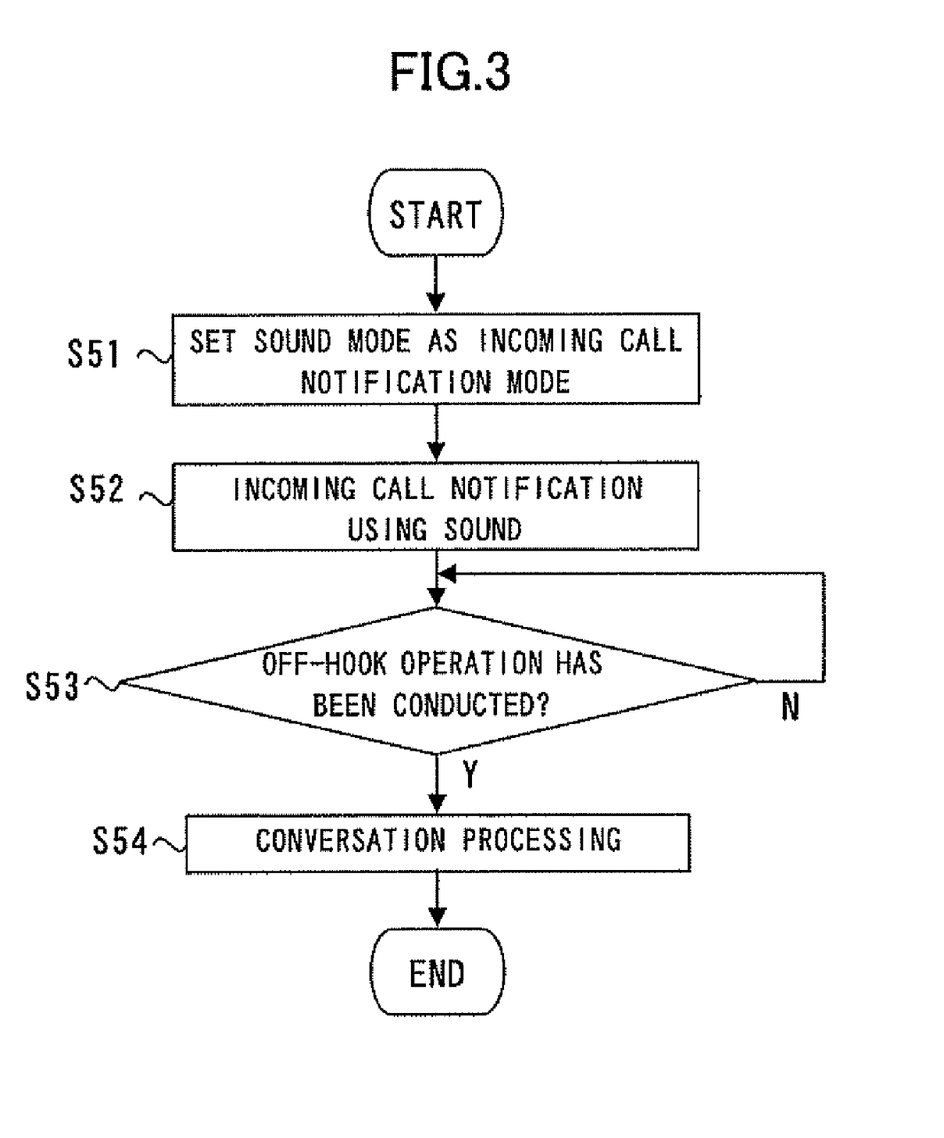
FIG. 3 is a flowchart showing an example of operation of the non-in-operation incoming call processing performed in the electronic device according to the present invention.

FIG. 3 is a flowchart showing an example of operation of the non-in-operation incoming call processing performed in the handheld terminal according to the present invention. The controller 1 sets a sound mode as an incoming call notification mode (S51). The controller 1 then performs an incoming call notification using sound according to the set incoming call notification mode (S52). In this incoming call notification, a ring alert is output by the voice I/O section 62. The controller 1 then determines whether off-hook operation has been conducted (S53). When the off-hook operation has not been conducted (N in S53), the flow returns to step S53. When the off-hook operation has been conducted (Y in S53), the controller 1 performs conversation processing (S54).

Operation of the in-operation incoming call processing performed in the handheld terminal according to the present invention will next be described.

Figure 4:
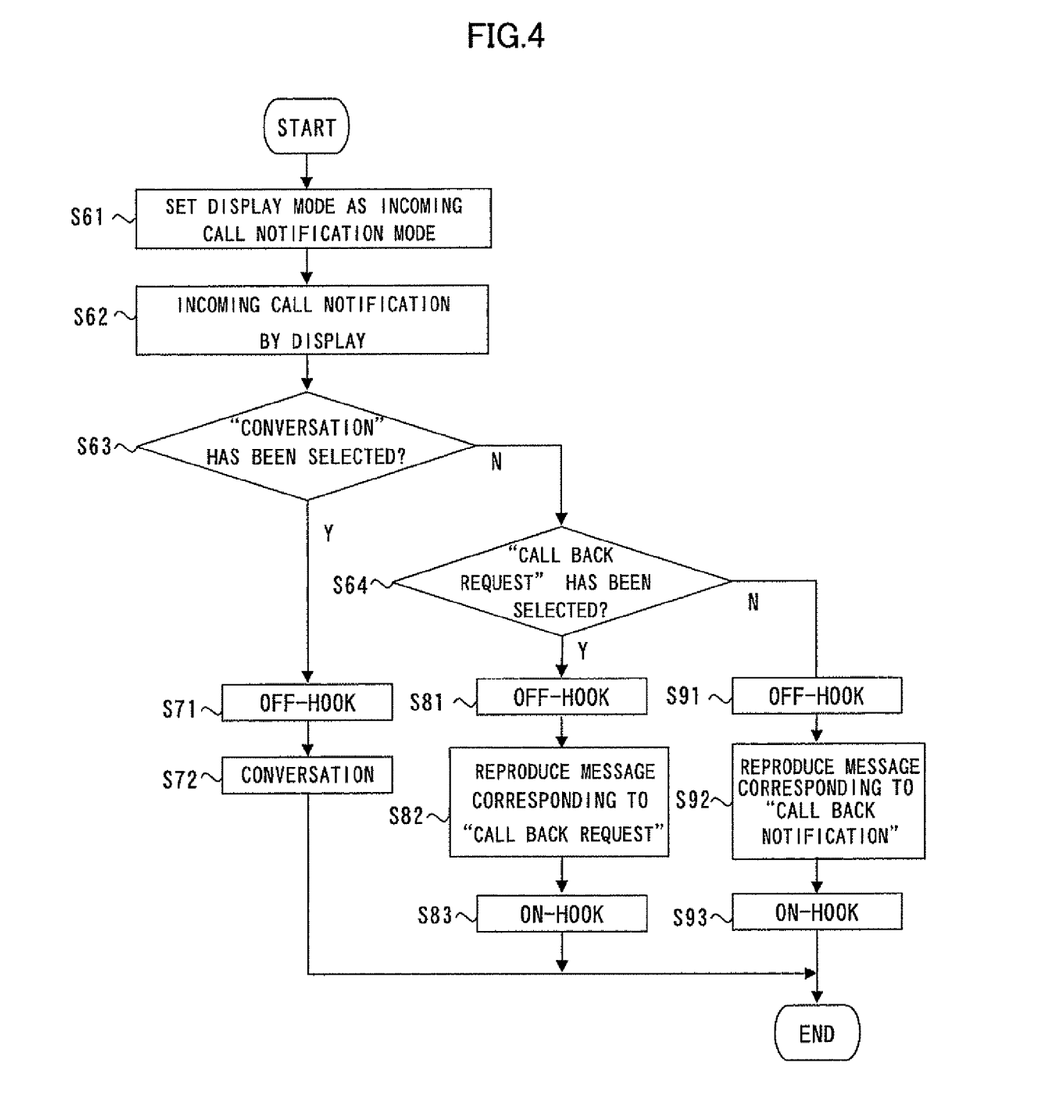
FIG. 4 is a flowchart showing an example of operation of the in-operation incoming call processing performed in the electronic device according to the present invention.

FIG. 4 is a flowchart showing an example of operation of the in-operation incoming call processing performed in the handheld terminal according to the present invention. The controller 1 sets a display mode as an incoming call notification mode (S61). The controller 1 then performs an incoming call notification by display according to the set incoming call notification mode (S62).

In this incoming call notification, incoming call information, caller information, reply method entries are displayed on the display section 63. The incoming call information is information notifying a user of the arrival of an incoming call, and caller information is telephone number of a caller or information about the caller which is stored in a phonebook. The reply method entries are reply method options from which a user selects a desired one. Further, on the display section 63, "conversation", "call back request", and "call back notification" are displayed as the reply method entries, from which a user can select a desired one by tapping the touch panel 55.

"Conversation" is a reply method in which a user has a direct conversation with the caller. "Call back request" is a reply method in which a message for asking the caller to call back is reproduced. For example, a message saying "I can't take your call at the moment, please call me back later" is reproduced. "Call back notification" is a reply method in which a message for notifying the caller that a recipient will call him back later is reproduced. For example, a message saying "I can't take your call at the moment, I'll call you back later" is reproduced. The messages corresponding to "call back request" and "call back notification" are stored in the storage section 71 and reproduced by the controller 1. A user taps or clicks a desired one of the reply method entries displayed on the display section 63 to thereby select it.

Then, the controller 1 determines whether "conversation" has been selected by a user as the reply method (S63). When "conversation" has been selected (Y in S63), the controller 1 goes off-hook (S71), starts the conversation processing (S72), and this flow is ended.

When a reply method other than "conversation" has been selected (N in S63), the controller 1 determines whether "call back request" has been selected by a user as the reply method (S64). When "call back request" has been selected (Y in S64), the controller 1 goes off-hook (S81), reproduces a message for asking the caller to call back (S82), goes on-hook (S83), and this flow is ended.

When a reply method other than "call back request" has been selected, that is, when "call back notification" has been selected (N in S64), the controller 1 goes off-hook (S91), reproduces a message for notifying the caller that a recipient will call him back later (S92), goes on-hook (S93), and this flow is ended.

Figure 5:
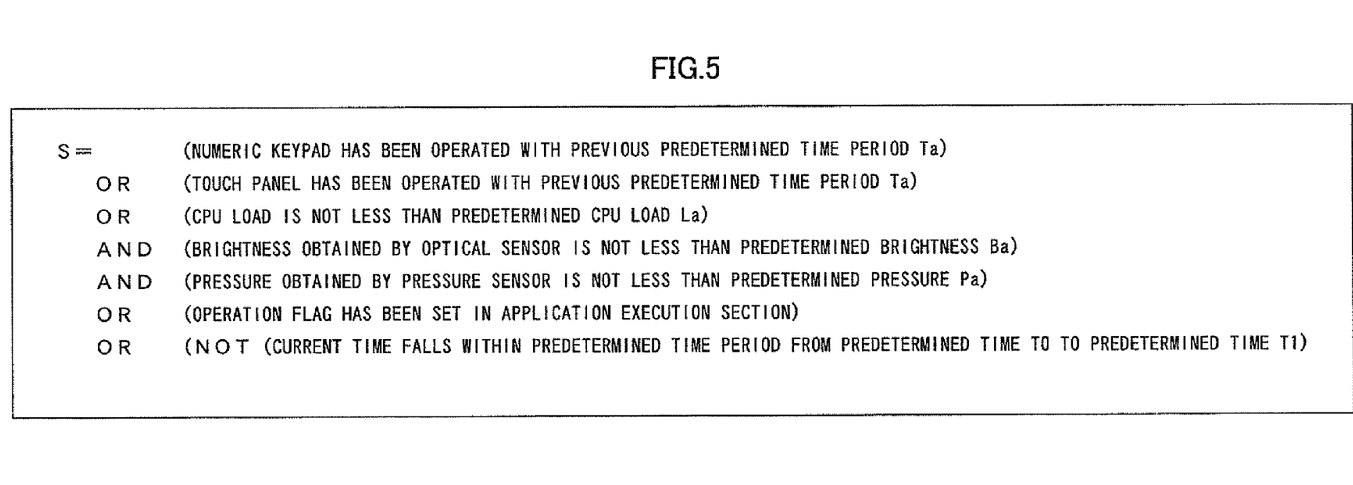
FIG. 5 shows an example of logical expressions for determining whether the electronic device according to the present invention is in operation at incoming time.

Although whether the handheld terminal is in operation or not is determined according to the flowchart of FIG. 2 in the present embodiment, the determination may be made according to logical expressions based on information from the timer section 51, optical sensor 52, pressure sensor 53, numeric keypad 54, touch panel 55, CPU load measurement section 56, application execution section 31, and the like. FIG. 5 shows an example of the logical expressions for determining whether the handheld terminal according to the present invention is in operation at incoming time. Using these logical expressions, the controller 1 determines whether to perform the in-operation incoming call processing or non-in-operation incoming call processing. That is, when a result S obtained based on the items corresponding to the respective determinations made in the flowchart of FIG. 2 is true, the controller 1 performs the in-operation call incoming processing, while when the result S is false, the controller 1 performs the non-in-operation incoming call processing. Such logical expressions may be set by a user.

Further, it is possible to provide a program that allows a computer constituting the handheld terminal to execute the above steps as an incoming call notification control program. By storing the above program in a computer-readable storage medium, it is possible to allow the computer constituting the handheld terminal to execute the program. The computer-readable medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; another computer and database thereof; and a transmission medium on a network line.

A condition detection section corresponds to the condition detection section 11, timer section 51, optical sensor 52, pressure sensor 53, numeric keypad 54, touch panel 55, and CPU load measurement section 56 in the embodiment. A notification section corresponds to the voice I/O section 62 and display section 63.

In the case where the numeric keypad 54 and touch panel 55 are used to perform the condition detection, user's input operation can directly be detected, so that user's operating condition can surely be detected.

Further, in the case where the CPU load measurement section 56 and operation flag set by the application execution section 31 are used to perform the condition detection, it is possible to detect that a user is operating the device even though the user is not performing an input operation while merely holding the device.

INDUSTRIAL APPLICABILITY

As has been described above, according to the present invention, by detecting user's operation or internal operating state, it is possible to detect whether the user is operating the electronic device and thereby to perform an adequate incoming call notification. Thus, it is possible to prevent the user being operating the device from being frightened by a ring alert. Further, even when the electronic device has been put into a bag with a setting being made so as not to make a ring alert, it is possible to prevent the user from being ignorant of occurrence of an incoming call. Further, in the case where an incoming call occurs while the user is operating the electronic device, he or she can promptly select a desired reply method depending on a caller or situation. Further, in the case where an incoming call occurs when the user is not operating the electronic device, unnecessary messages are not displayed on the display section, thereby suppressing power consumption.

The invention claimed is:

1. An electronic device, comprising:
   a condition detection section that detects a user's operating conditions in the electronic device, the detected operating conditions including at least one of an ambient brightness surrounding the electronic device and a pressure applied to the electronic device;
   a controller that sets an incoming call notification mode based on at least one of the detected operating conditions; and
   a notification section that performs an incoming call notification to the user according to the set incoming call notification mode, wherein
      incoming call notification modes that can be set by the controller include an incoming call notification mode using sound and an incoming call notification mode by display, and
      in the incoming call notification mode by display, the notification section displays reply method entries to allow a user to select a desired, displayed reply method entry.

2. The electronic device according to claim 1, wherein the condition detection section further detects, as one of the detected operating conditions, at least one of a key operation, a touch panel operation, a CPU load, and an identifier set in an application program while it is running, and
   the controller sets the incoming call notification mode based additionally on the further detected operating conditions.

3. The electronic device according to claim 1, wherein the incoming call notification mode is set by the controller based on logical expressions using a plurality of the detected operating conditions, and the logical expressions are set by a user.

4. The electronic device according to claim 1, wherein the condition detection section detects both the ambient brightness and the pressure, and the controller sets the incoming call notification mode based on a combination of the detected ambient brightness and the detected pressure.

5. An incoming call notification control method for controlling an electronic device, comprising:
   detecting a user's operating conditions in the electronic device, the detected operating conditions including at least one of an ambient brightness surrounding the electronic device and a pressure applied to the electronic device;
   setting an incoming call notification mode based on at least one of the detected operating conditions; and
   performing an incoming call notification to the user according to the set incoming notification mode, wherein
      incoming call notification modes that can be set by said setting include an incoming call notification mode using sound and an incoming call notification mode by display, and
      in the incoming call notification mode by display, said performing displays reply method entries to allow a user to select a desired, displayed reply method entry.

6. The incoming call notification control method according to claim 5, wherein
   said detecting further detects, as the detected operating conditions, at least one of a key operation, a touch panel operation, a CPU load, and an identifier set in an application program while it is running, and
   said setting sets the incoming call notification mode based additionally on the further detected operating conditions.

7. The incoming call notification control method according to claim 5, wherein
   the incoming call notification mode is set by said setting based on logical expressions using a plurality of the detected operating conditions, and
   the logical expressions are set by a user.

8. The incoming call notification control method according to claim 5, wherein said detecting detects both the ambient brightness and the pressure, and said setting sets the incoming call notification mode based on a combination of the detected ambient brightness and the detected pressure.

9. A non-transitory computer readable medium having stored thereon an incoming call notification control program which, when executed by an electronic device, causes the electronic device to perform:
   detecting a user's operating conditions in the electronic device, the detected operating conditions including at least one of an ambient brightness surrounding the electronic device and a pressure applied to the electronic device;
   setting an incoming call notification mode based on at least one of the detected operating conditions; and
   performing an incoming call notification to the user according to the set incoming notification mode, wherein
      incoming call notification modes which can be set by said setting include an incoming call notification mode using sound and an incoming call notification mode by display, and
      in the incoming call notification mode by display, said performing displays reply method entries to allow a user to select a desired, displayed reply method entry.

10. The incoming call notification control program according to claim 9, wherein
    said detecting further detects, as the operating conditions, at least one of a key operation, a touch panel operation, a CPU load, and an identifier set in an application program while it is running, and
    said setting sets the incoming call notification mode based additionally on the further detected operating conditions.

11. The incoming call notification control program according to claim 9, wherein the incoming call notification mode is set by said setting based on logical expressions using a plurality of the detected operating conditions, and
the logical expressions are set by a user.

12. The non-transitory computer readable medium according to claim 9, wherein said detecting detects both the ambient brightness and the pressure, and said setting sets the incoming call notification mode based on a combination of the detected ambient brightness and the detected pressure.

\* \* \* \* \*

UNITED STATES PATENT AND TRADEMARK OFFICE
CERTIFICATE OF CORRECTION

| | | |
|---|---|---|
| PATENT NO. | : 7,937,116 B2 | |
| APPLICATION NO. | : 11/772415 | |
| DATED | : May 3, 2011 | |
| INVENTOR(S) | : Shoichi Sano | |

It is certified that error appears in the above-identified patent and that said Letters Patent is hereby corrected as shown below:

Column 7, Lines 54-58 in Claim 3, delete

"3. The electronic device according to claim 1, wherein
the incoming call notification mode is set
by the controller based on logical expressions using a plurality of the detected operating
conditions, and the logical expressions are set by a user."

and insert

-- 3. The electronic device according to claim 1, wherein
the incoming call notification mode is set by the controller based on logical expressions using a
plurality of the detected operating conditions, and
the logical expressions are set by a user. --, therefor.

Signed and Sealed this
Fifth Day of July, 2011

David J. Kappos
*Director of the United States Patent and Trademark Office*